March 23, 1937.  E. G. CARROLL  2,074,719
BRAKE
Original Filed April 13, 1932   3 Sheets-Sheet 1

INVENTOR.
EUGENE G. CARROLL
BY Jerome R. Cox
ATTORNEY.

INVENTOR.
EUGENE G. CARROLL
BY Jerome R Cox
ATTORNEY.

Patented Mar. 23, 1937

2,074,719

UNITED STATES PATENT OFFICE 2,074,719

BRAKE

Eugene G. Carroll, Los Angeles, Calif., assignor to Bendix Aviation Corporation, South Bend, Ind., a corporation of Delaware Application April 13, 1932, Serial No. 605,083
Renewed September 3, 1935

4 Claims. (Cl. 60—54.6)

This invention relates to brakes and more especially to hydraulic operating systems therefor.

One of the objects of my invention is to provide improved means for developing and maintaining a superatmospheric pressure acting upon the liquid in a hydraulic brake system so as to keep the operating part of the system full of liquid at all times and to eliminate the springy pedal accompanying the presence of air mixed with the liquid in said operating part of the system.

A further object of the invention is to provide improved means for preventing the ingress of air into the operating parts of the system and especially into the wheel cylinders thereof.

Further objects of the invention will be apparent after a reading of the subjoined specification and claims and after a consideration of the attached drawings in which:

Figure 1:
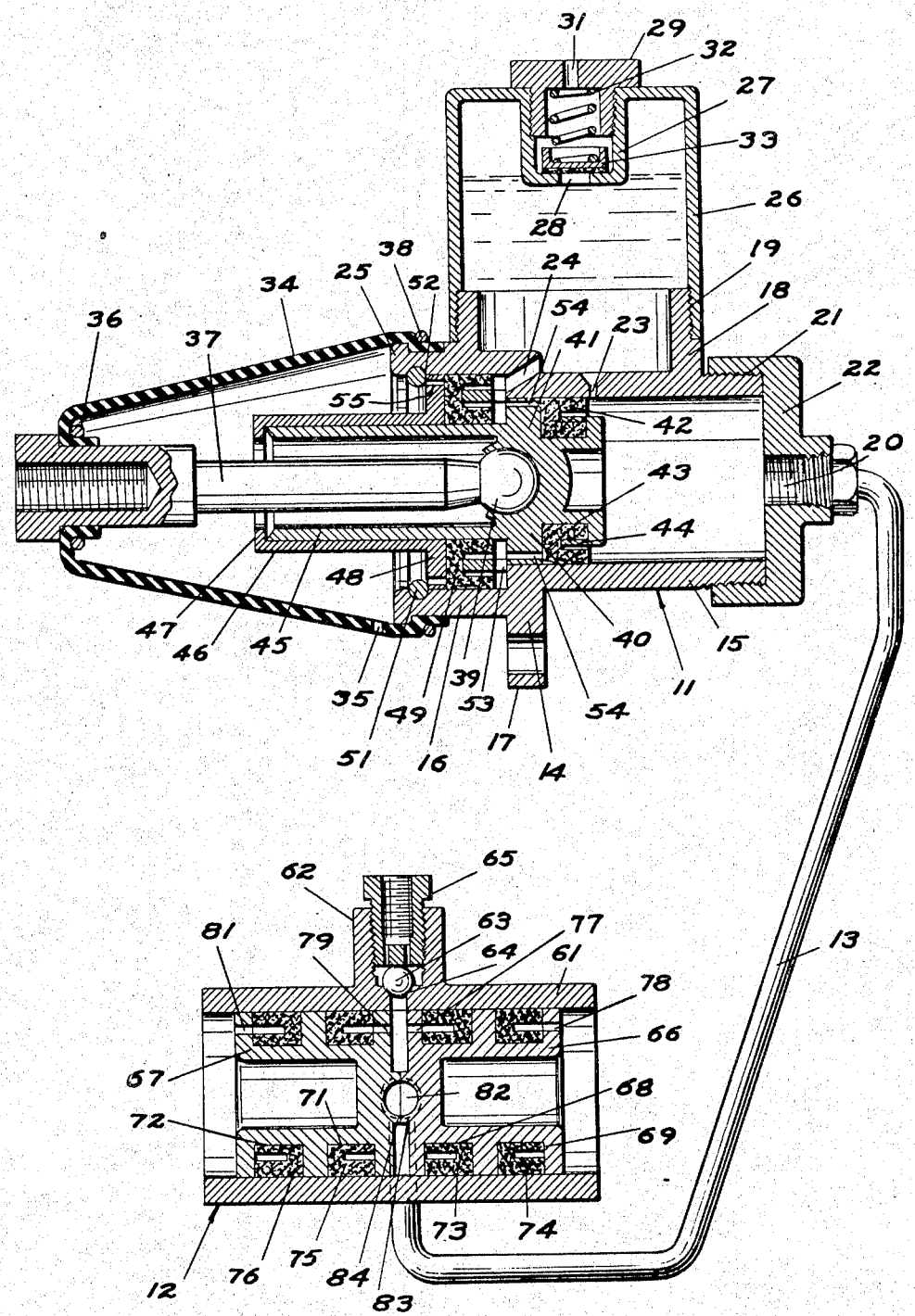
Figure 1 is a view showing, more or less diagrammatically, parts of a hydraulic braking system including a master cylinder, a wheel cylinder, and connections between the master cylinder and the wheel cylinder.

Referring in particular to the drawings, there is shown in Figure 1, a master cylinder generally designated 11, a wheel cylinder generally designated 12 and fluid connections indicated by the line 13. The cylinder 11 is formed of a casting 14 having a forwardly extending cylindrical portion 15 and a rearwardly extending cylindrical portion 16 having a larger diameter. On the under side of the casting 14 there is formed a downwardly extending bracket 17 by which the cylinder 11 may be secured to an automotive vehicle. The upper side of the casting is formed with an annular flange 18 forming a well and is exteriorly threaded as at 19 for the reception of a cover which is designed to coact with the frame to serve as a fluid reservoir.

The casting 11 is formed at its forward end with threads 21 for the reception of an outlet cap 22. It has a restricted inlet port 23 formed through the cylindrical portion 15 and opening into the well formed by the annular flange 18 and has a relatively large port 24 extending diagonally through the junction between the concentric cylindrical portions 15 and 16. The rear end of the casting 14 is provided with an annular flange 25 by means of which a boot may be secured to the casting.

Secured on the threads 19 is a cylindrical cover 26 which serves together with the well formed by the flange 18 to provide a container or reservoir for a reserve supply of liquid for the hydraulic braking system. The upper end of the cap 26 is formed with a cylindrical depression 27 having an opening 28 in the center thereof. A plug 29 having a vent opening 31 is screwed into the depression 27 and serves as an abutment for a compression spring 32 which bears at its lower end upon a cup valve 33. The spring 32 is of such a weight that pressure within the reservoir may be increased to a certain pre-determined amount before any fluid can escape past the valve which thus constitutes a spring loaded valve.

The cap 22 is provided with a tapped opening 20 into which there is threaded a pipe forming a portion of the connection 13. Secured to the rear end of the casing 14 by means of the flange 25 is a rubber boot 34 which serves to exclude dust and dirt but allows the ingress of air through an opening 35. Passing through the boot 34 and secured thereto by a spring clip 36 is a piston rod 37 which is connected in any convenient manner to a pedal for operating the braking system. The forward end of the boot is secured over the flange 25 by a spring clip 38 and the forward end of the piston rod 37 is formed with a ball head 39 through which it is secured to a plunger or piston 40.

The plunger 40 is formed with a head 41 which substantially fills the bore of the cylindrical portion 15 and as an aid in sealing the bore, carries an annular sealing cup 42. The cup 42 may be made of rubber or other suitable material and serves to prevent the passage of fluid rearward past the head 41. The cup 42 is secured in an annular groove 42 by means of a circular flat spring ring 44. The plunger 40 is provided with a rearwardly extending cylinder 45 which telescopes within a sleeve 46 formed with a rearward flange 47 for limiting the rearward movement of the piston 39 and with a fixed head 48 substantially filling the bore of the portion 16 and serving as a support for an annular sealing cup 49.

The sleeve 46 and the head 48 are prevented from being displaced rearwardly by means of a spring stop 51 seated in a groove 52 and are prevented from being displaced forwardly by means of a tubular member 53 which bears at its forward end against the shoulder formed by the junction between the portions 15 and 16 and bears at its rearward end on the annular cup 49 thus serving not only to position the cylinder 46 but also serving to maintain the cup 49 in the desired position. The movable head 41 and the fixed head 48 are each formed with a plurality of small ports such as 54 and 55 respectively through which fluid may pass forwardly.

The wheel cylinder 12 comprises a cylindrical casting 61 formed with an up-standing annular flange or boss 62 which forms a well within which there is positioned a ball 63 normally adapted to seat upon a cooperating valve seat 64 and to prevent the escape or ingress of fluid through the boss which thus forms a bleed opening. The projection 62 is formed with threads and a vented plug 65 having a wrench receiving head is screwed into said projection and normally maintains the ball 63 upon its seat. Positioned in the casting 61 are a pair of plungers or pistons 66 and 67, each formed with a pair of annular grooves such as 68 and 69, and 71 and 72 respectively. The grooves 68, 69, 71, and 72 are provided with packing cups 73, 74, 75, and 76 respectively, said cups serving to prevent the exit or ingress of fluid from or into the wheel cylinder. It is to be noted that the cups 74 and 76 face outward while the cups 73 and 75 face inward. The plunger 66 is provided with a port 77 leading from the interior of the wheel cylinder to the groove 68 and with a port 78 leading to the atmosphere from the groove 69. The plunger 67 is similarly provided with ports 79 and 81. The plungers are also provided with inwardly extending projections 83 and 84 which position the plungers to insure that the inlet opening 82 from the conduit 13 shall always remain open.

In preparing the hydraulic brake system shown in Figure 1 for operation, the plug 29 and the valve 33 are removed and the reservoir 26 is filled with suitable liquid. The plug 65 is backed off from its seat so as to allow the check valve 63 to move at times off of its seat in the bleeding operation. Reciprocation of the rod 37 and the piston formed by the movable head by means of the pedal, forces any air trapped in the system out past the check valve 63 on the forward stroke and at the same time draws liquid from the reservoir 26 through the port 24 and into the chamber formed between the fixed head 48 and the movable head 41. On the rearward stroke liquid from between two heads is sucked past the movable head by reason of the vacuum created in the system ahead of said movable head. On the next forward stroke, this liquid together with the trapped air is forced out past the check valve 63. Reciprocation is continued until the system is completely filled with liquid and until all air is driven out from the system.

Thereupon the plug 65 is screwed down to maintain the check valve 63 upon its seat and the valve 33 and the plug 29 are reinserted in the position shown in the drawings. Thereafter, reciprocation of the plunger 40 serves to apply the brakes through the wheel cylinder. When the reservoir is first filled and bled and the assembly including the plug 29 inserted, the pressure on the liquid in the reservoir is approximately atmospheric. The movement of the plunger 40 forward forces liquid to the wheel cylinders and thus lowers the pressure in the reservoir. On account of this lowering of pressure and because no air can enter through the valve 33, some air is drawn in through the vent 35 and the ports 55 and is subsequently compressed in the upper end of the reservoir 26 to maintain the liquid in the system under supercharged pressure, the amount of such pressure being controlled by the weight of the spring 32.

Figure 2:
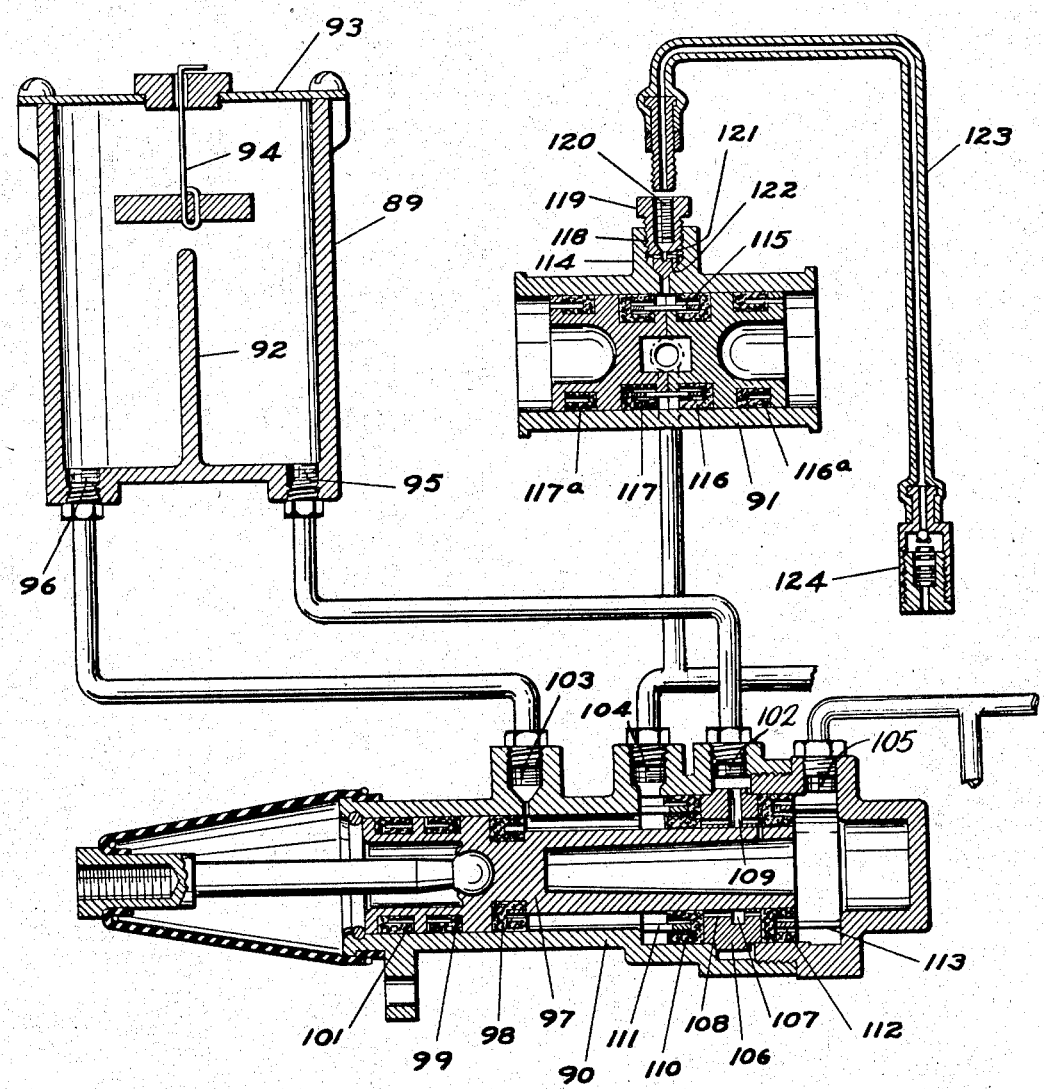
Figure 2 is a view showing a modified system of hydraulic brakes.

The brake system shown in Figure 2 comprises a reservoir 89, a master cylinder 90, and wheel cylinder 91. The reservoir 89 is provided with a partition 92, a cover 93, and a liquid level indicator 94. It has outlet openings 95 and 96 which are connected to the master cylinder 92.

The master cylinder 90 has a plunger 97 provided with a plurality of annular sealing cups such as 98, 99, and 101 the first named facing forward and the last two named being reversed relative to each other and positioned toward the rear. By reason of these cups, fluid is prevented from leaving or entering the cylinder except through openings 102 and 103 which are connected with the openings 95 and 96 respectively of reservoir 89 or through openings 104 and 105 connected with the front and rear brakes respectively.

The plunger 97 slides through a head 106 which is secured within the cylinder 90 so as to be allowed a limited longitudinal movement therein, the head being provided with ports such as 107, 108, and 109 communicating with the opening of 102. Rearwardly of the head 106, there is provided an annular packing cup 110 which faces rearwardly and is held in position by a tubular member 111 which may be formed if desired by a short section of pipe. Forward of the head 106 there is provided a similar packing cup 112 which faces forwardly and is held in position by a similar tubular member 113. It is to be noted that the length of members 111 and 113 as well as the groove in which the head 106 is seated allow a slight longitudinal movement of the head 106 and with it, the cups 109 and 112 so as to allow equalizing of pressure between the front and rear brakes.

The wheel cylinder 91 is substantially the same as the cylinder 12 previously described and is provided with an annular boss or projection 114 corresponding to the projection 62. However, a tubular member 115 is provided for holding the cups 116 and 117 in position when the fluid in the cylinder is not under brake applying pressure. It is to be understood that when operating pressure is applied to the fluid, the fluid itself maintains the cups in their position. The plungers are also provided with additional packing cups 116a and 117a smaller in area and facing outward. The projection 114 is internally threaded as at 118 and has screwed therein a plug 119 formed with a conical end adapted to seat in a conical shaped valve seat concentric with the projection 114. The plug 119 is itself formed with a tapped opening 120 and with intersecting bores 121 and 122. A bleeding hose 123 provided with a check valve 124 is adapted to be threaded into the tapped opening 120 for the bleeding operation, the plug 119 being adapted to be loosened for the same operation.

In the operation of the braking system shown in Fig. 2, pressure applied by the pedal is adapted to move the plunger 97 forward, thus immediately closing the port leading to the opening 103 and forcing fluid through the outlet opening 104 to the front brakes and through the outlet opening 105 to the rear brakes. The displaced fluid creates pressure in the wheel cylinders and forces the plungers in the wheel cylinders apart for applying the brakes. Slight movement of the head 106 is normally effective to equalize the pressure between the front system and the rear system. However, should a leak develop in either the connections leading to the front brakes, or in the connections leading to the rear brakes, the head 106 will move to its limit of travel and the other system of brakes (rear or front) will be unaffected by the leak.

In the bleeding operation the plug 118 is backed off slightly from its seat and the bleeding hose 123 is attached. Then liquid is forced to the wheel cylinders by movement of the piston and is thence forced out past the check valve 124 carrying with it any air which may be trapped in the system. On the return stroke, the check valve 124 prevents air from returning into the wheel cylinder and additional liquid is drawn into the master cylinder through the opening 102 and then through the bores 107, 108, and 109 and past the cups 110 and 112. Should an excess of pressure be developed in the system, the pressure may be relieved through openings 103 and 114 when the parts are in the brake-off position. It is to be understood that during the bleeding operation, the plug 118 is backed off slightly from its seat.

Figure 3:
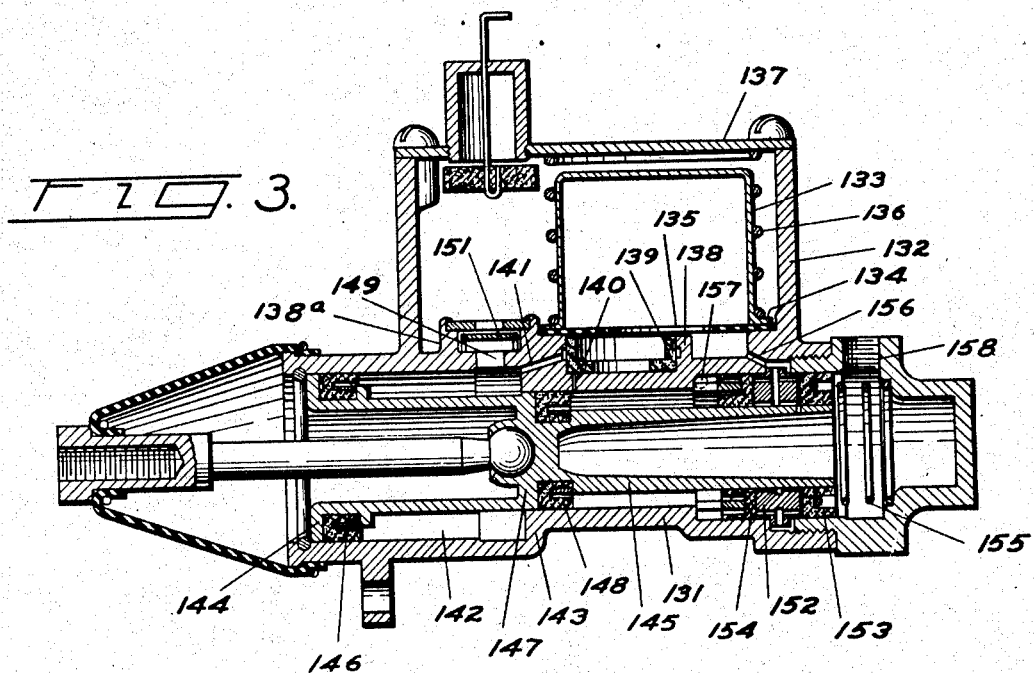
Figure 3 is a view showing a modified form of master cylinder adapted to be substituted for the master cylinder shown in Figure 1.

In Figure 3, I have shown a modified form of cylinder somewhat similar to that shown in Figure 2, but differing in certain details therefrom. The master cylinder 131 has formed integrally therewith a covered annular flange 132 which serves as a combined reservoir and pressure chamber for supercharging the system. Positioned in the flange 132 is an inverted container 133 formed with a flange 134. The container is normally urged downward into contact with an annular packing plate 135 by means of a compression spring 136 which at its lower end bears upon the flange 134 and at its upper end bears against the cover 137 for the flange 132. The cylinder 131 is also provided with two other smaller annular flanges 138 and 138a, neither concentric with the flange 132. In the well formed by the flanges 138 there is positioned an annular sealing cup 139 having an L cross section. The cup 139 covers ports 140 and 141 which allows liquid to flow into the interior of the container 133 from the ports 140 and 141 but prevents liquid from passing out through the ports 140 and 141 from the interior of the container 133. The port 141 leads to a chamber 142 formed between a shoulder 143 provided in the cylinder 131 and a head or piston 144 formed at the rear of the plunger 145, the port 140 normally leading forward of that chamber. Coacting with the head 144 is an annular sealing cup 146 which prevents the passage of fluid rearward past the head. The plunger 145 is also formed with a forward head 147 provided with a sealing cup 148, the head and the cup forming a piston and being normally positioned just rearwardly of the port 140 and forwardly of the point at which the port 141 connects with the chamber 142. When the plunger is operated, however, the piston is moved forward past the port 140. The chamber 142 is also provided with an opening 149 connected through the well formed by the flange 138a with the reservoir 132 outside of a container 133 the reservoir outside of the container being vented to the atmosphere. Associated with the opening 149 is a check valve 151 seated in the flange 138a, the valve allowing liquid to flow in from the reservoir 132 to the chamber 142 but preventing liquid from passing from the chamber to the reservoir.

The cylinder 131 is provided with an equalizing head 152 corresponding substantially with the head 106 and with cups 153 and 154 corresponding substantially to the cups 112 and 110. The cup 153 however, is normally maintained upon its seat by means of a spring 155 which also normally urges the head 152 toward its rearward position. Liquid is suppied to the passageways formed in the head 152 through a diagonal port 156 which leads to the interior of the container 133.

Before operation of this form of master cylinder, liquid is poured into the reservoir 132. Operation of the plunger 145 forces air trapped in the cylinders through the openings 157 and 158 to the forward and rear brakes respectively and out of the wheel cylinder past a check valve such as one of the check valves 53 or 124. On the rearward stroke, liquid is drawn into the chamber 142 past the check valve 151. Subsequent forward strokes force the liquid drawn into chamber 142 through port 141 into the container 133 and thence through the port 156 past the cups 153 and 154 to the forward brake system and the rear brake system. After the system has been filled with liquid; slight losses of liquid from the forward brake system may be compensated for by passage of liquid forward past the cup 148 as well as by passage of liquid rearward past the cup 154. Losses of liquid in the rear brake system are compensated by passage of liquid past the cup 153. Repeated operations of the plunger serve to supercharge the pressure by drawing in liquid past the valve 151 and forcing it through the port 141 into the container 133 and to the top of said container until the pressure therein reaches the weight of the spring 136 whereupon the pressure in the container 133 may be relieved back to the main part of the reservoir 132 by lifting the container off of the packing 135.

Figure 4:
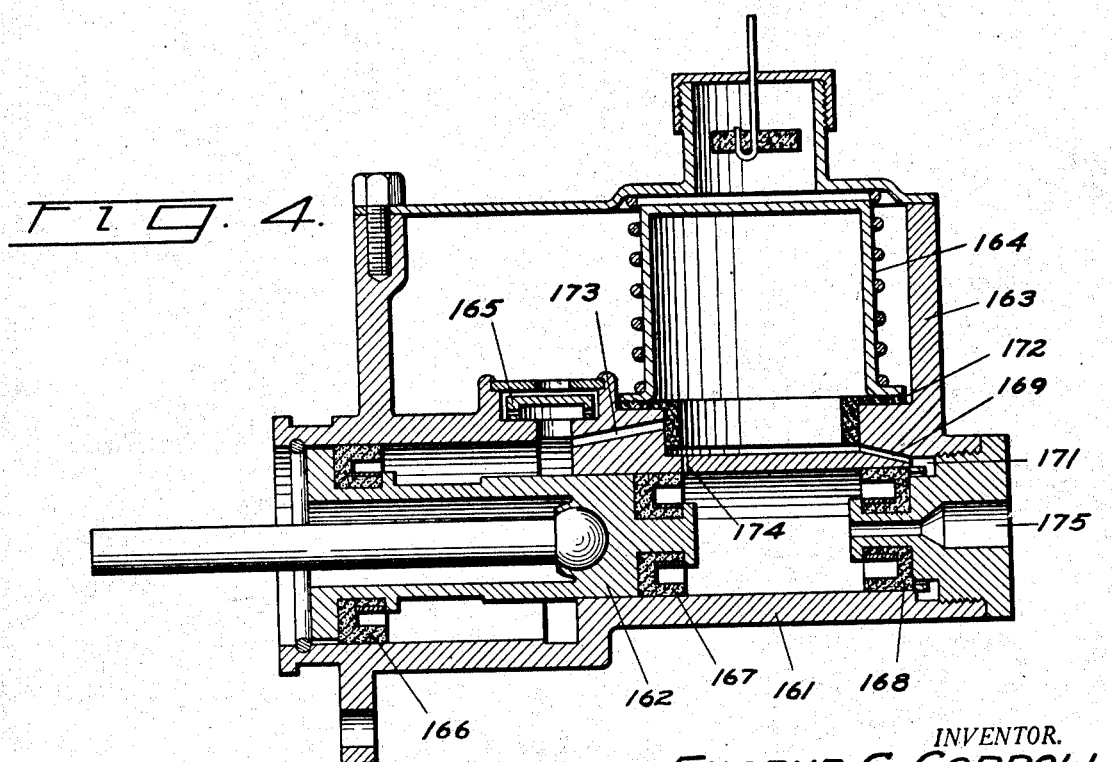
Figure 4 is a view showing another modified form of master cylinder also adapted to be substituted for the master cylinder shown in Figure 1.

The modified form of master cylinder shown in Figure 4 is very similar to that shown in Figure 3 but is considerably simpler and cheaper to construct inasmuch as no arrangements are provided for separate systems for the front and rear brakes. Therein the cylinder 161 has a plunger 162 which corresponds substantially to the plunger 145, a reservoir 163 which corresponds substantially to the reservoir 132, and a container 164 which corresponds substantially to the container 133. The check valve 165 corresponds substantially to the check valve 151, and the cups 166, 167, 168 correspond substantially to the cups 145, 148, and 154. A port 169 corresponding to the port 156 leads to an annular recess 171 which corresponds substantially to the recess for the equalizing head 152. However, an annular flanged packing 172 which has an L shape in cross section fulfills the functions of the annular packing 134 and also fulfills part of the functions of the cup 139 in serving as a one way check valve for the port 173. The port 174 is closed only when covered by the cup 167. An outlet port 175 at the forward end of the cylinder is located in the center of the cup 168 and leads to all of the wheel cylinders of the front and rear brakes.

The operation of this form of my device is substantially the same as that shown in Figure 3, with the exception that no provision is made for keeping the front brake system separate from the rear brake system.

The inventions relating to wheel cylinders are also shown and are claimed in my copending application Serial No. 23,426, filed May 25, 1935. The inventions relating to the master cylinder shown in Figure 2 is also shown and is claimed in my copending application Serial No. 23,425, filed May 25, 1935.

It is to be understood that the above described embodiments of my invention are for the purpose of illustration only and various changes may be made therein without departing from the spirit and scope of the invention.

I claim:

1. In a hydraulic brake system a master cylinder having a forwardly extending portion of relatively small diameter and a rearwardly extending portion of relatively large diameter; a fixed head in said rearwardly extending portion formed with ports and provided with an inwardly opening cup valve; a movable plunger in said forwardly extending portion; means for reciprocating said plunger for increasing the size of the compartment formed between said head and said plunger; and a reservoir associated with said master cylinder, having a port connecting the reservoir with said compartment, and having a spring loaded valve opening to the atmosphere.

2. In a master cylinder a rear head formed with a plurality of ports, an annular cup packing associated with said head and positioned in advance thereof for preventing the passage of fluid rearwardly through said ports but allowing the passage of fluid forwardly through said ports, and a rubber boot covering the rear end of said cylinder for preventing the ingress of dust and dirt but formed with a vent opening for allowing air to pass into said boot and through said ports into said cylinder.

3. In a hydraulic brake system a master cylinder having a forwardly extending portion of relatively small diameter and a rearwardly extending portion of relatively large diameter; a fixed head for said rearwardly extending portion formed with ports and provided with an inwardly opening cup valve; a movable plunger in said forwardly extending portion forming together with said fixed head a compartment therebetween; means for reciprocating said plunger for increasing the size of the compartment formed between said head and said plunger; and a reservoir associated therewith, said master cylinder having a port connecting the reservoir with said compartment.

4. In a hydraulic braking system for operating brakes; a master cylinder formed with a compensating port and a supply port and having a forwardly extending portion of relatively small diameter, a rearwardly extending portion of relatively large diameter, a fixed head provided with a packing and positioned in said rearwardly extending portion, and a rearwardly extending sleeve associated with said fixed head; a movable plunger including a movable head normally positioned between said ports, provided with a packing for developing brake applying pressure, and forming together with said fixed head a compartment therebetween, and a rearwardly extending cylindrical piston portion slidably mounted in said sleeve and extending through said fixed head into said forwardly extending portion; means for reciprocating said plunger so that the forward movement thereof increases the size of the compartment formed between said head and said plunger; a reservoir connected with the compensating port and connected with the supply port of the master cylinder between said fixed head and said movable head so the forward movement of said plunger serves to draw liquid in from said reservoir; and a fluid connection between the forward end of said master cylinder and said brakes.

EUGENE G. CARROLL.